United States Patent
Lin

(10) Patent No.: US 11,232,311 B1
(45) Date of Patent: Jan. 25, 2022

(54) METHOD FOR GUIDING VEHICLE TO PARK, ELECTRONIC EQUIPMENT, AND NON-TRANSITORY STORAGE MEDIUM

(71) Applicant: Shenzhen Fugui Precision Ind. Co., Ltd., Shenzhen (CN)

(72) Inventor: Po-Yu Lin, New Taipei (TW)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 0 days.

(21) Appl. No.: 17/228,891

(22) Filed: Apr. 13, 2021

(30) Foreign Application Priority Data

Sep. 25, 2020 (CN) .......................... 202011027688.4

(51) Int. Cl.
| | | |
|---|---|---|
| G08G 1/14 | (2006.01) | |
| G07B 15/02 | (2011.01) | |
| G06K 9/00 | (2006.01) | |
| G06K 9/46 | (2006.01) | |
| G06N 7/00 | (2006.01) | |
| G08G 1/01 | (2006.01) | |
| H04N 5/235 | (2006.01) | |

(52) U.S. Cl.
CPC ....... *G06K 9/00812* (2013.01); *G06K 9/4652* (2013.01); *G06N 7/005* (2013.01); *G08G 1/0129* (2013.01); *G08G 1/143* (2013.01); *G08G 1/144* (2013.01); *G08G 1/146* (2013.01); *H04N 5/2353* (2013.01)

(58) Field of Classification Search
CPC .................................................. G16H 40/63
See application file for complete search history.

(56) References Cited

U.S. PATENT DOCUMENTS

| | | | | |
|---|---|---|---|---|
| 2014/0368636 | A1* | 12/2014 | Lee ..................... | G06K 9/00812 348/118 |
| 2016/0114795 | A1* | 4/2016 | Kiyokawa ............. | G01S 15/931 342/55 |
| 2019/0073902 | A1* | 3/2019 | Indoh ....................... | G08G 1/04 |
| 2020/0070815 | A1* | 3/2020 | Ko ........................... | G08G 1/146 |
| 2020/0105002 | A1* | 4/2020 | Chen ...................... | H04N 5/225 |
| 2021/0229743 | A1* | 7/2021 | Lee .................... | G01C 21/3407 |

FOREIGN PATENT DOCUMENTS

CN        110497901 A       11/2019

OTHER PUBLICATIONS

Gee, iParking—Real-Time Parking Space Monitor and Guiding System with Cloud Service, Mar. 30, 2016, National Cheng Kung University, Taiwan, ROC.

\* cited by examiner

*Primary Examiner* — Joseph H Feild
*Assistant Examiner* — Pameshanand Mahase
(74) *Attorney, Agent, or Firm* — ScienBiziP, P.C.

(57) ABSTRACT

A method providing guidance to a vehicle for parking includes: obtaining information of potential parking space. Information of the parking space includes likelihood of finding unoccupied parking space and navigating to the parking space according to the information of parking space. The information of the parking space guides a driver to quickly find the parking space, thereby reducing parking time, improving parking space utilization, and efficiency of road traffic management. Calculating the likelihood of finding an unoccupied space is of great assistance to a driver.

10 Claims, 15 Drawing Sheets

US 11,232,311 B1

METHOD FOR GUIDING VEHICLE TO PARK, ELECTRONIC EQUIPMENT, AND NON-TRANSITORY STORAGE MEDIUM

FIELD

The subject matter herein generally relates to smart transportation technology, in particular to a parking guidance method, a electronic equipment and a storage medium thereof.

BACKGROUND

A shortage of parking spaces is often the pressing issues in urban traffic development. Difficulties in finding open parking spaces and the time spend in find open parking spaces are not only main concerns for drivers. but also affects the efficiency of road traffic management.

BRIEF DESCRIPTION OF THE DRAWINGS

Implementations of the present technology will now be described, by way of embodiment, with reference to the attached figures, wherein.

DETAILED DESCRIPTION

Figure 1:
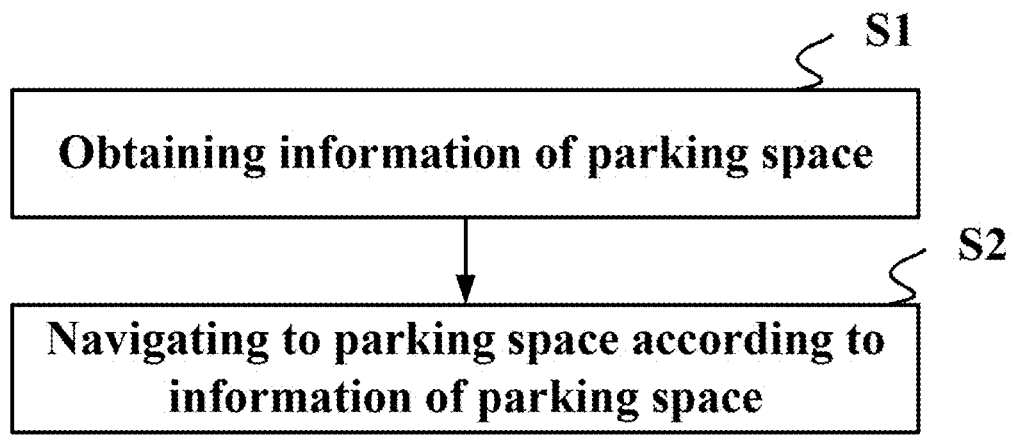
FIG. 1 is a flowchart of one embodiment of a method providing parking guidance to a vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. The term "comprising," when utilized, is "including, but not necessarily limited to"; it specifically indicates open-ended inclusion or membership in the so-described combination, group, series, and the like. References to "an" or "one" embodiment in this disclosure are not necessarily to the same embodiment, and such references mean "at least one."

FIG. 1 illustrates a method providing parking guidance to a vehicle according to an embodiment of the disclosure. As shown in FIG. 1, in step S1, information of parking areas can be stored in a cloud server. Drivers or passers-by can upload information as to parking areas to the cloud server in real time. The information as to parking spaces comprises the respective locations and times of the parking spaces. Drivers can obtain such information by querying the cloud server. The information of parking spaces includes a likelihood of current availability (reliability) of the parking spaces. The reliability of the parking space is at least related to following information: upload time of parking space being available (for example, the closer to the current time the higher the reliability), time of day/night (for example, commuting time, working time, night, etc.), traffic volume (for example, congested, average, light and sparse), district characteristics (for example, urban area, suburban area, area of popular attraction, etc.). Specifically, in some embodiments, the reliability of parking space R (Reliability) can be calculated by formula (1):

$$R = (TTL/T\max) \cdot Dt \cdot (0.5)^N \qquad (1)$$

TTL (time to leave) represents the remaining valid time of the parking space, Tmax represents the maximum valid time of the parking space, Dt represents a decay coefficient of the portion of the current road in the current period, and N represents the number of vehicles that have passed the current location but not found the parking space. The decay coefficient Dt can be obtained by analyzing the historical data of the parking space on the current road section.

Figure 2:
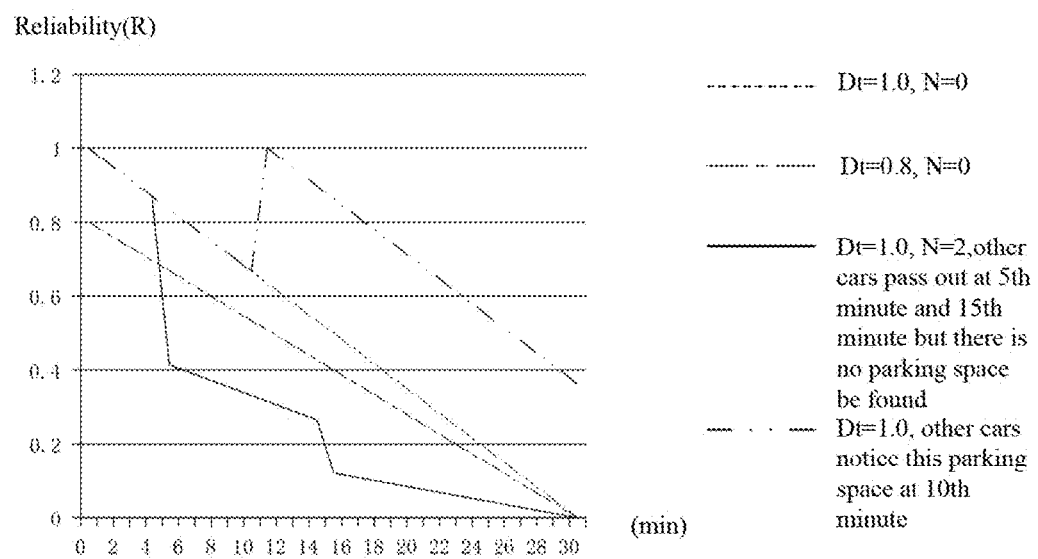
FIG. 2 is a diagram showing changing reliability in the availability of parking spaces over time.

The reliability of the park space can be updated in real time based on the feedback information from the cloud server. If there are other vehicles passing the current road segment after the current time but no parking space is found, the value of the reliability is reduced. If the parking area of the current road segment has been used or there is no parking space on the current road segment, a value of the reliability is set to zero. If the current road section is not used for parking for a certain period of time, the value of the reliability will decrease with time. As shown in FIG. 2, an initial value of R is 1 when a default Tmax=30 min, Dt=1.0, N=0. R is inversely proportional to the effective time of the parking space. In other words, as the effective time changes, TTL gradually decreases and the value of R decreases accordingly. The initial value of R is 0.8 when Dt=0.8, N=0. A first vehicle can pass by but find no parking space in the $5^{th}$ minute when Dt=1.0, N=2, the value of R is reduced by 50% of that before the first vehicle passed. A second vehicle passing by in the 15$^{th}$ minute reduces the value of R to 50% of that before the second vehicle passed. The value of R is reset to 1 when Dt=1.0 and other vehicles find an available parking space in the 10$^{th}$ minute. The value of R changes linearly with the change of the TTL value when Dt, N, and Tmax are constant. In other words, the smaller TTL corresponds to a smaller value of R.

In some embodiments, the information of parking spaces include a list of all parking spaces near the current road segment and a ranking of locations is determined by the reliability and how far away the parking space may be. For example, the higher the reliability and the closer the parking space may be, the higher is the location ranking in list of the parking space. In some embodiments, the information of parking space includes the GPS location of the parking space, upload time, a parking space image, and effective time.

In step S2, an appropriate parking space is found and a navigation path is planned to assist a driver to quickly find the suitable parking space. Navigation can be radio navigation, radar navigation, or satellite navigation.

The parking guidance method of the first embodiment of the disclosure can be applied to vehicle-mounted terminals or user terminals. The parking guidance guides the drivers to find a parking space according to the information received, which reduces the parking search time and make full use of the existing parking space to improve the efficiency of use of parking spaces. The vehicle-mounted terminal includes a driving recorder, a vehicle-mounted camera, and a vehicle-mounted computer. The user terminals include cellular phones, smart phones, personal digital assistants (PDAs), handheld devices, laptops, tablets, cameras, medical devices or medical equipment, bio sensors/devices, wearable devices such as smart watches/smart clothing/smart glasses/smart wristbands/smart jewelry (smart rings, smart bracelets, etc.), entertainment equipment (music equipment, video equipment, satellite radio, etc.), vehicle components or vehicle sensors, smart meters/smart sensors, industrial manufacturing equipment, global positioning system equipment, or any other equipment suitable for communicating via wireless or wired media.

In some embodiments, there is step S3 after step S1 (refer to FIG. 1). The step 3 further includes: predicting a probability value of the parking space according to the information. A historical data can be analyzed for each road section at different times (for example, weekdays or holidays). The probability value of finding parking space is predictable according to the historical data. Drivers can make a driving plan by obtaining the probability value for different periods of the road section near the destination, thereby avoiding the peak period of parking on the destination road section, and reducing the time for finding parking. For example, drivers can set the destination and specify travel time. The probability value on the road near the destination can be obtained by querying the information of the cloud server. The probability value of a predicted parking space being available can be divided into three categories: high, medium and low. A high probability value that the parking space is available means that it is easier to find a available parking space near the road section at a specified time. In the case that the destination is determined, the drivers can dynamically adjust the travel time according to the probability value, and select the time of day/night when the parking space probability value of the target parking section is high. In the case that the travel time is confirmed, the driver can also dynamically plan the parking section near the destination according to the probability value of parking space, and select a parking area with the high probability value of the parking space available in a certain period of day/night. In other embodiments, the execution timing of step S3 is not limited. For example, step S2 can also be executed after step S3 is executed.

Referring to FIG. 1, in some embodiments, there is step S4 as follows: uploading the location and information of usage of the parking space. The information of the parking space of the cloud server comes from the location and the usage of the parking space uploaded in real time by drivers or by passers-by. The vehicle-mounted terminal or user terminal captures the parking space image when the driver is driving or the passer-by is walking, and uploads the parking space image, shooting time, and the location and the information of usage to the cloud server in real time. The cloud server summarizes, analyzes, and stores the information at different times in relation to one road section. It is necessary to confirm that parking is allowed on the current road section to avoid illegal parking before uploading the location and the usage information of parking areas. The driver can query the cloud server to confirm whether the current road section includes a parking facility. The vehicle-mounted terminal or the user terminal can realize real-time sharing of the information through interaction with the cloud server. The driver is provided with real-time parking guidance service. In other embodiments, the vehicle-mounted terminal or the user terminal captures the parking space image, analyzes the parking space image to obtain the information of parking space, and uploads the parking space image and the information to the cloud server. The cloud server aggregates and stores the information in relation to each road section at different time periods. In other embodiments, the vehicle-mounted terminal or the user terminal captures the parking space image and uploads the parking space image to a MEC (mobile-edge computer) server. The MEC server analyzes the parking space image to obtain the information of available parking space and then the MEC server uploads the information to the cloud server. The cloud server aggregates and stores the information in relation to each road section at different time periods.

Figure 3:
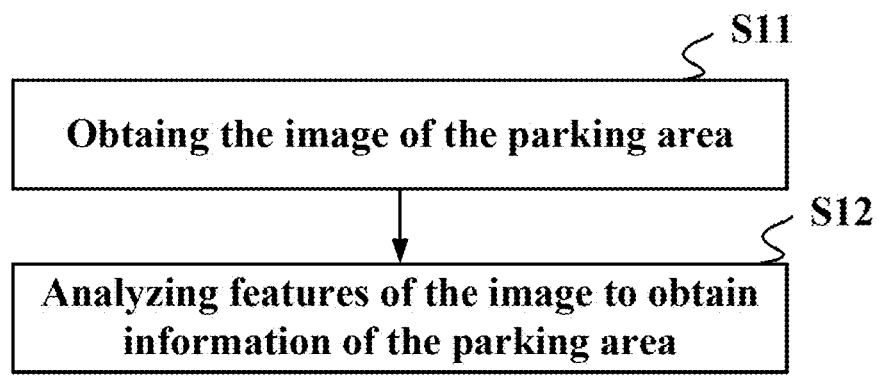
FIG. 3 is a sub-flow chart of step S1 of the method according to FIG. 1.
Figure 4:
FIG. 4 shows a parking space identification area in one embodiment.

It should be noted that in other embodiments, the timing of execution of step S4 is not limited. For example, step S4 can be executed before step S1 is executed, or step S2 can be executed after step S4 is executed. Step S4 also can be executed before step S3 is executed. Referring to FIG. 3, step S1 includes the following sub-steps: by step S11, obtaining the parking space images. In step S11, the parking space image can be captured by the vehicle-mounted terminal or the user terminal. It can also be obtained by connecting to a back-end server of the parking lot and querying a monitoring image of the parking lot. It can also be obtained by connecting a cloud monitoring server of the transportation department and querying the monitoring image of a roadside parking grid. According to Step S12, the parking space images are analyzed to obtain the information of the parking space. As shown in FIG. 4, step S12 first sets a parking spot recognition area (like the roadside parking grid in FIG. 4), and then identifies available parking spaces in the parking spot recognition area. In order to identify the parking space, it is necessary to confirm whether features in the image are consistent with corresponding features of an available parking space or model. A parking space can be identified in the parking space image when the features are consistent.

It can be understood that the features of a parking space or model may include a shape of a single parking space, the shape of a general vehicle or a license plate, and so on. The shape of single parking shape includes closed and complete features (such as closed quadrilaterals) and partial features that are not completely closed (such as upper three-sided features, left three-sided features, or two-sided features, etc.). The information of parking space can be obtained according to analysis of many parking space images, and accuracy of image features can be improved according to analysis with big data.

Figure 5:
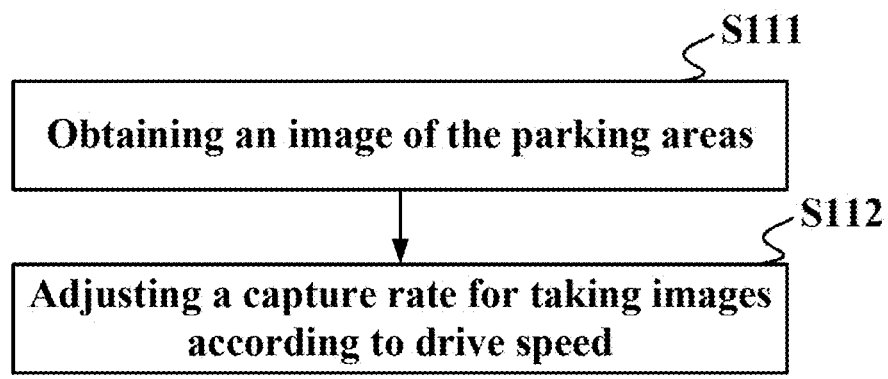
FIG. 5 is a sub-flow chart of step S11 in the method according to FIG. 3.

In some embodiments, referring to FIG. 5, step S11 includes the following sub-steps: by step S111, taking images of the parking space. By Step S112, adjusting image capture rate according to the current vehicle speed. The vehicle-mounted terminal or the user terminal can take pictures of the parking space in real time when in motion, but sharpness of image is difficult to ensure when in-motion pictures are taken, the problem of unclear pictures is likely to occur. To ensure the clarity of the parking space image, an appropriate image-capturing rate must be adopted. Adjusting the rate according to the vehicle speed can improve the clarity of the parking space image. Errors of mis-identifying features are avoided due to the image clarity problem and the accuracy of identifying the parking space is improved.

Figure 6:
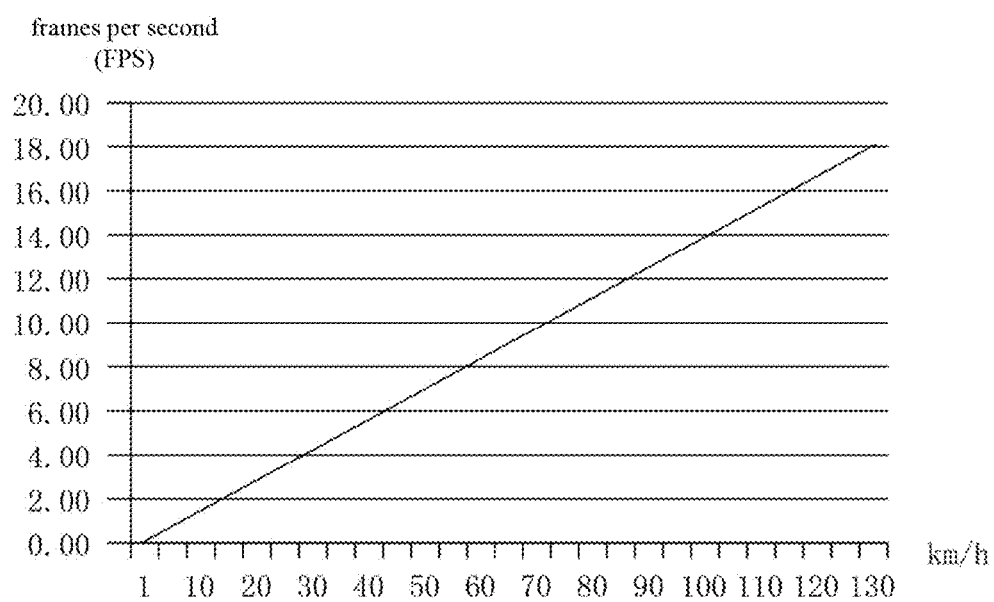
FIG. 6 is a graph showing variations of the image-capturing rates vs. driving speeds ranging between zero and 130 kph.

In some embodiments, the image capture rate is positively correlated with the speed of the vehicle. As shown in Table 1, in the case of determining the image shooting distance, recording the image shooting rate used by the same car at different driving speeds. As shown in FIG. 6, the curve of image shooting rate versus vehicle speed is performed linearly on the data in Table 1. It can be seen from a fitting curve that the higher the speed of the vehicle the higher is image capture rate. The image capture rate has a linearly positive correlation with speed of the vehicle. The clarity of the parking space image can be ensured by adjusting the positive correlation between the image capture rate and speed of the vehicle.

TABLE 1

| Vehicle speed (km/h) | Vehicle speed (m/sec) | Image shooting interval distance (m) | Image capture rate (fps) |
|---|---|---|---|
| 1 | 0.28 | 2 | 0.14 |
| 5 | 1.39 | 2 | 0.69 |
| 10 | 2.78 | 2 | 1.39 |
| 15 | 4.17 | 2 | 2.08 |
| 20 | 5.56 | 2 | 2.78 |
| 25 | 6.94 | 2 | 3.47 |
| 30 | 8.33 | 2 | 4.17 |
| 35 | 9.72 | 2 | 4.86 |
| 40 | 11.11 | 2 | 5.56 |
| 45 | 12.50 | 2 | 6.25 |
| 50 | 13.89 | 2 | 6.94 |
| 55 | 15.28 | 2 | 7.64 |
| 60 | 16.67 | 2 | 8.33 |
| 65 | 18.06 | 2 | 9.03 |
| 70 | 19.44 | 2 | 9.72 |
| 75 | 20.83 | 2 | 10.42 |
| 80 | 22.22 | 2 | 11.11 |
| 85 | 23.61 | 2 | 11.81 |
| 90 | 25.00 | 2 | 12.50 |
| 95 | 26.39 | 2 | 13.19 |
| 100 | 27.78 | 2 | 13.89 |
| 105 | 29.17 | 2 | 14.58 |
| 110 | 30.56 | 2 | 15.28 |
| 115 | 31.94 | 2 | 15.97 |
| 120 | 33.33 | 2 | 16.67 |
| 125 | 34.72 | 2 | 17.36 |
| 130 | 36.11 | 2 | 18.06 |

Image-Capturing Rate Value Table

In some embodiments, image capture rate FPS (frames per second) can be calculated by formula (2):

$$FPS = 1/(D/V) \quad (2)$$

V represents the current speed of the vehicle. D represents the distance between image captures that is a distance per image to be captured.

Figure 7:
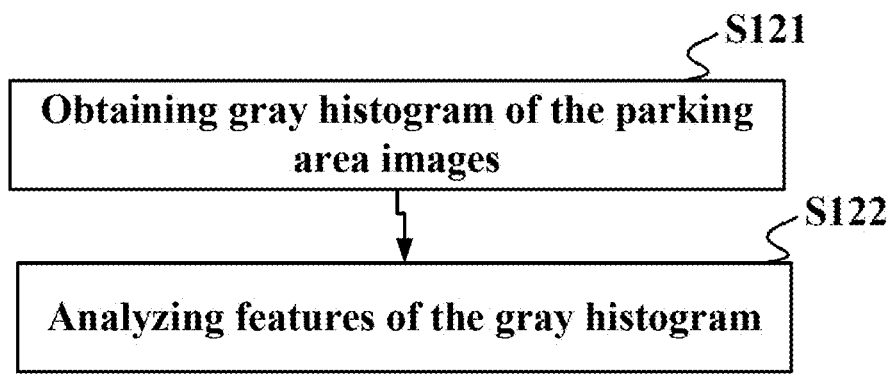
FIG. 7 is a sub-flow chart of step S12 according to FIG. 3.

In some embodiments, referring to FIG. 7, step S12 includes following sub-steps: step S121: A gray bar graph of the parking space image is obtained. In step S121, the gray bar graph is draw by isolating pixels in the parking space image, and counting the number of pixels with sufficiently-different gray values.

Step S122: the features of gray value are analyzed. In step S122, the parking spot recognition area is set. The parking space is identified in the parking spot recognition area. The features of gray value in the gray bar graph are consistent with the features of gray value in the parking space. An available parking space in the parking space image is determined as found when the gray value features are consistent.

Figure 8A:
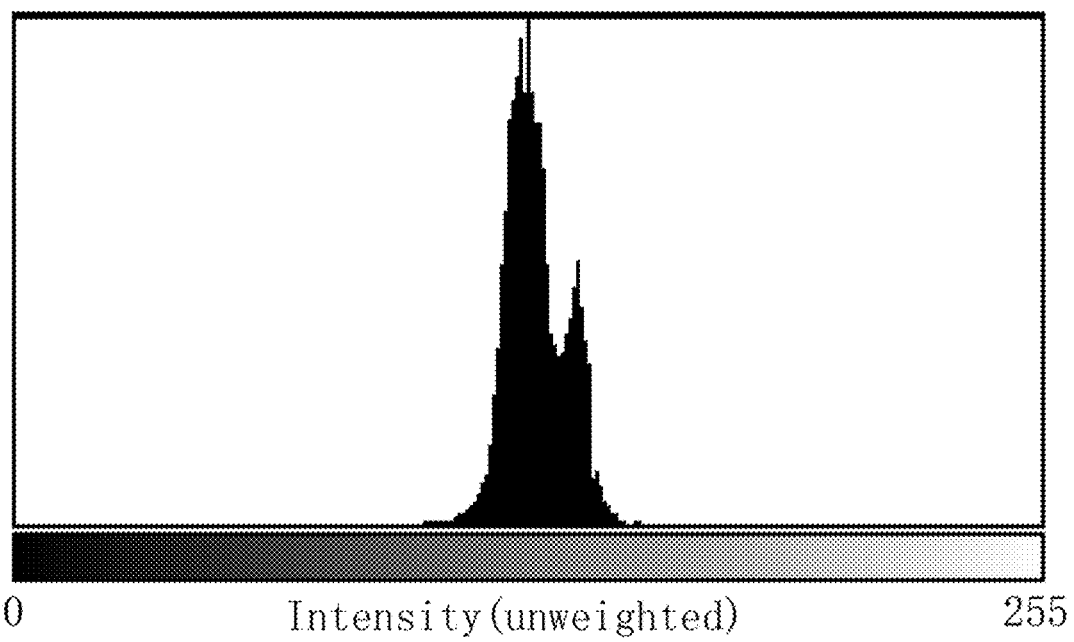
FIG. 8a and FIG. 8b are grayscale bar graphs showing weighted and unweighted intensities of features distribution of the parking space image in one embodiment.
Figure 8B:
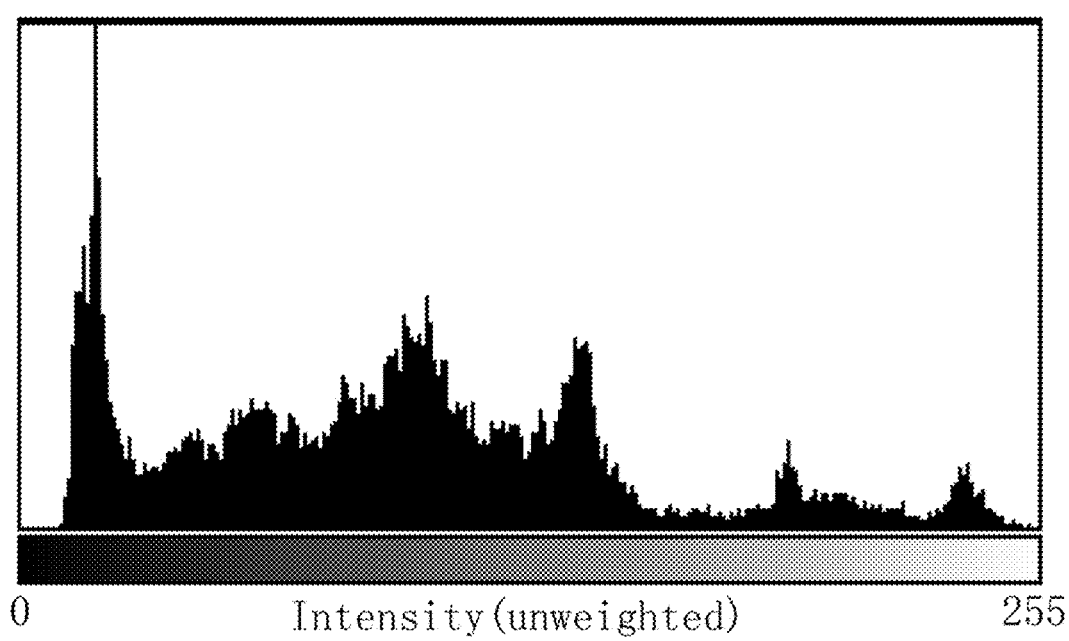

In some embodiments, reference should be made to FIG. 8a and FIG. 8b. FIG. 8a is a gray bar graph with a relatively concentrated gray value distribution. FIG. 8b is a gray bar graph with relatively scattered gray value distribution. The gray value distribution in the gray bar graph is more concentrated, the smaller the standard deviation of the gray value, the greater is the probability value that there is the parking space within the corresponding parking space image. The more scattered the gray value distribution in the gray bar graph, the larger is the standard deviation of the gray value, and the smaller is the probability value that there is parking space in the corresponding parking space image. The information of the parking space can be obtained remotely for analysis of the gray bar graph corresponding to the parking space image. The accuracy of automatic identification of the parking space can be improved by analysis with big data.

The following provides some exemplary scenarios to specifically describe some of the above features and feature combinations of this application.

Figure 9A:
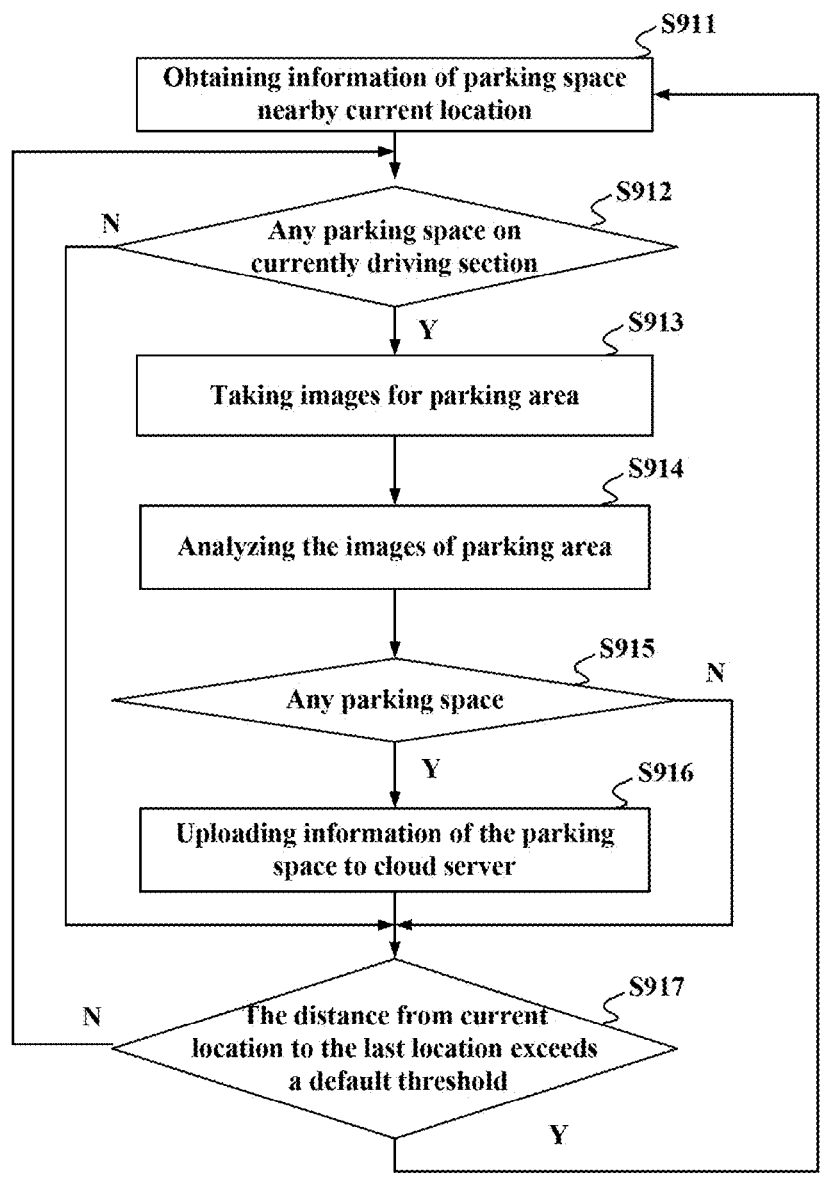
FIG. 9a and FIG. 9b are charts of flow of steps in one embodiment relevant to a first traffic scenario.

Scenario 1:

The information of parking space is uploaded automatically by the vehicle-mounted terminal or the user terminal when the vehicle is driving. Referring to FIG. 9a, the vehicle-mounted terminal or the user terminal obtains information of parking space around the current location (S911). The surrounding area of the current location can include an area with radius of 1 Km or 2 Km from the current location, or other area within a certain distance range defined according to the actual scene. A determination is made as to whether there is the parking space in the current driving section (S912). If there is the parking space in the current driving section, the image of the parking space is taken while the vehicle is moving (S913). The image capture rate is adjusted according to the driving speed. The image of the parking area is analyzed (S914). A determination is made as to whether there is an parking space in the image of the parking areas (S915). The information of parking space is uploaded to the cloud server if there is a parking space in the image of the parking area (S916). The information of parking space includes the image of the parking area, GPS location, and time of recording. The information of parking space of the current location and the last location are checked if there is no parking space in the current driving section. A distance between the current location and the last location is checked to determine whether a threshold distance (S917) is exceeded. The threshold distance can be set according to the actual scene, such as 500 m or 1 Km. Step S911 is performed when the distance between the current location and the previous location exceeds the threshold distance. Step S912 is performed when the distance between the current location and the previous location does not exceed the threshold distance. Step S917 is performed when there is no parking space in current road section.

Figure 9B:
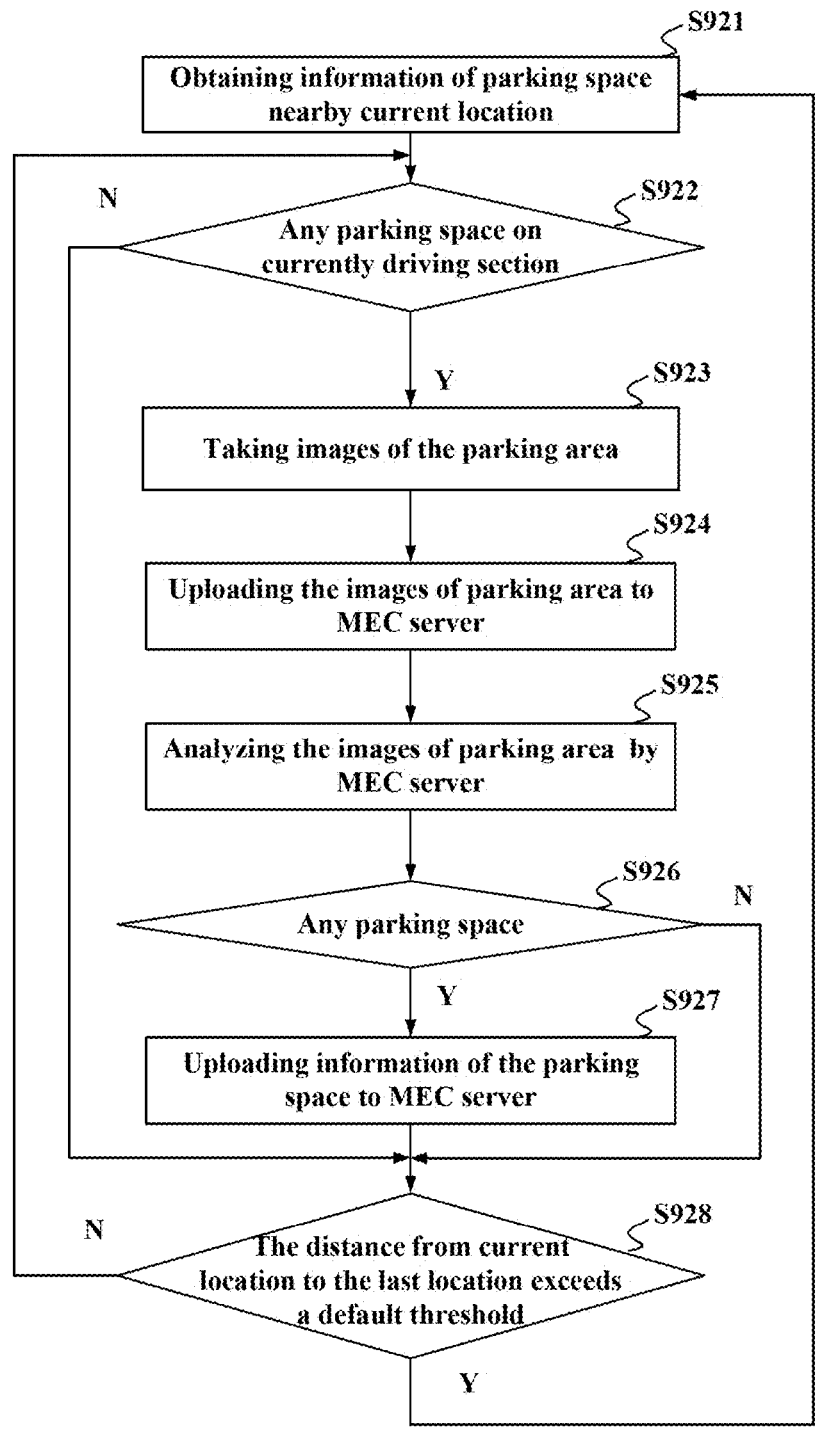

Referring to the step shown in FIG. 9a, the vehicle-mounted terminal or the user terminal in FIG. 9a analyzes the image of parking area (S914) and uploads the information of the parking space to the cloud server (S916). The vehicle-mounted terminal or the user terminal in FIG. 9b uploads the image of parking space to the MEC server (S924). The MEC server analyzes the image of the parking area (S925) and uploads the information of the parking space to the cloud server (S927). The other steps in FIG. 9b have steps similar to those in FIG. 9a: step S921 to step S923 are similar to step S911 to step S913, step S926 is similar to step S915, and step S928 is similar to step S917.

Figure 10A:
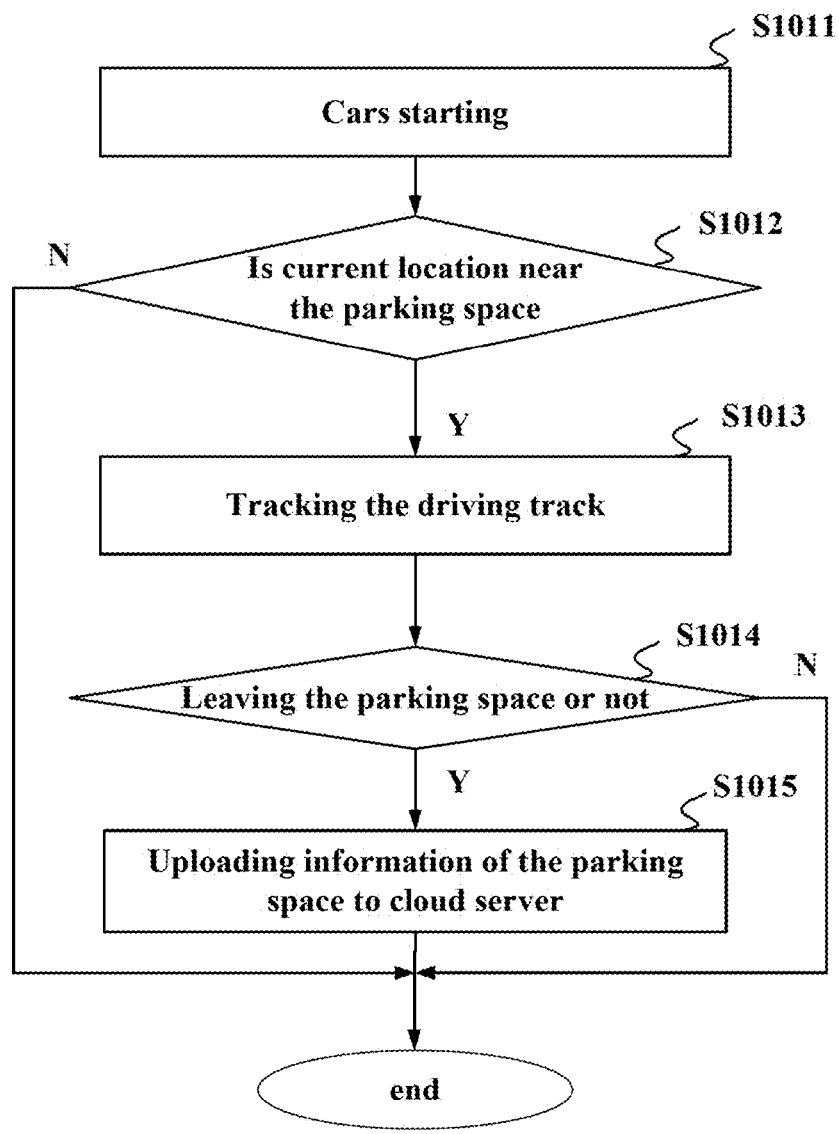
FIG. 10a and FIG. 10b are charts of flow of steps in one embodiment relevant to a second traffic scenario.

Scenario 2:

Drivers send the information of the parking space to the cloud server by the vehicle-mounted terminal or the user terminal after the parking space is used. Referring to FIG. 10a, when the vehicle is started (S1011), the current location is determined by the vehicle-mounted terminal or the user terminal. For example, the current location is within 2 m of the parking space. A trajectory is tracked when the current location of the vehicle is near the parking space (S1013). A departure determination is made when the vehicle leaves the parking space (S1014). The information of the parking space is uploaded to the cloud server when the vehicle leaves the parking area (S1015). The information of the parking space includes GPS location and time of recording.

Figure 10B:
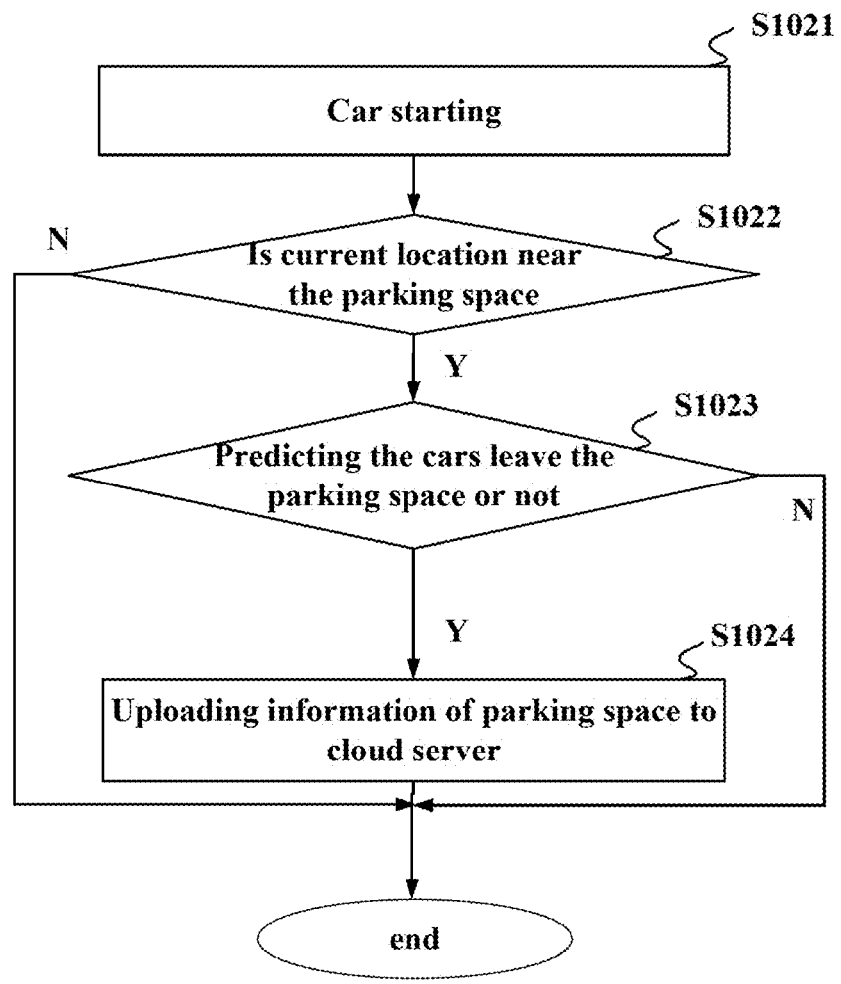

Referring to the step in FIG. 10a, the trajectory of the vehicle is tracked (S1013). It is determined whether the vehicle has left the parking area (S1014). In FIG. 10b, it is determined whether the vehicle is leaving the parking area (S1023). The driver can actively trigger a leaving-now-instruction according to his driving trajectory. A trigger method includes voice, button, or any other recognizable command. The other steps in FIG. 10b are similar to steps in FIG. 10a: step S1021 to step S1022 are similar to step S1011 to step S1012, and step S1024 is similar to step S1015.

Figure 11:
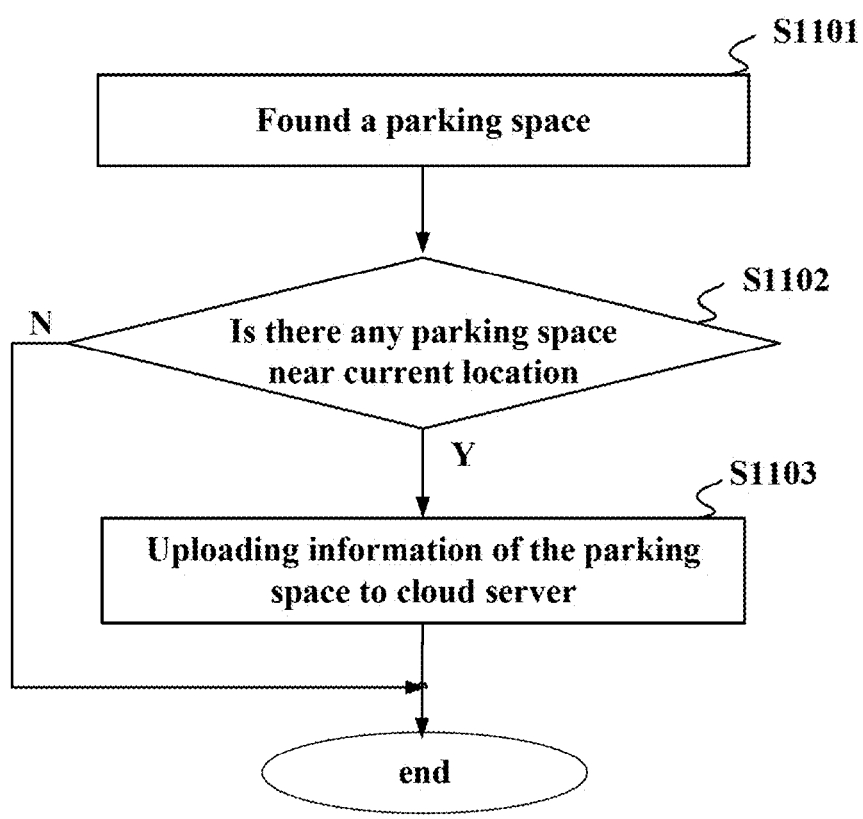
FIG. 11 is a chart of flow of steps in one embodiment relevant to a third traffic scenario.

Scenario 3:

The passer by finds the parking space and uploads the information of parking space to the cloud server by the user terminal. As shown in FIG. 11, the parking space is found (S111). The user terminal confirms whether there is the parking space near the current location (S112). For example, the user is within 30 m of the parking space. The information of the parking space is uploaded to the cloud server when there is the confirmed parking space near the current location (S113). The information of the parking space includes: GPS location, number of the parking spaces, the image of the parking space, and time of recording.

Figure 12:
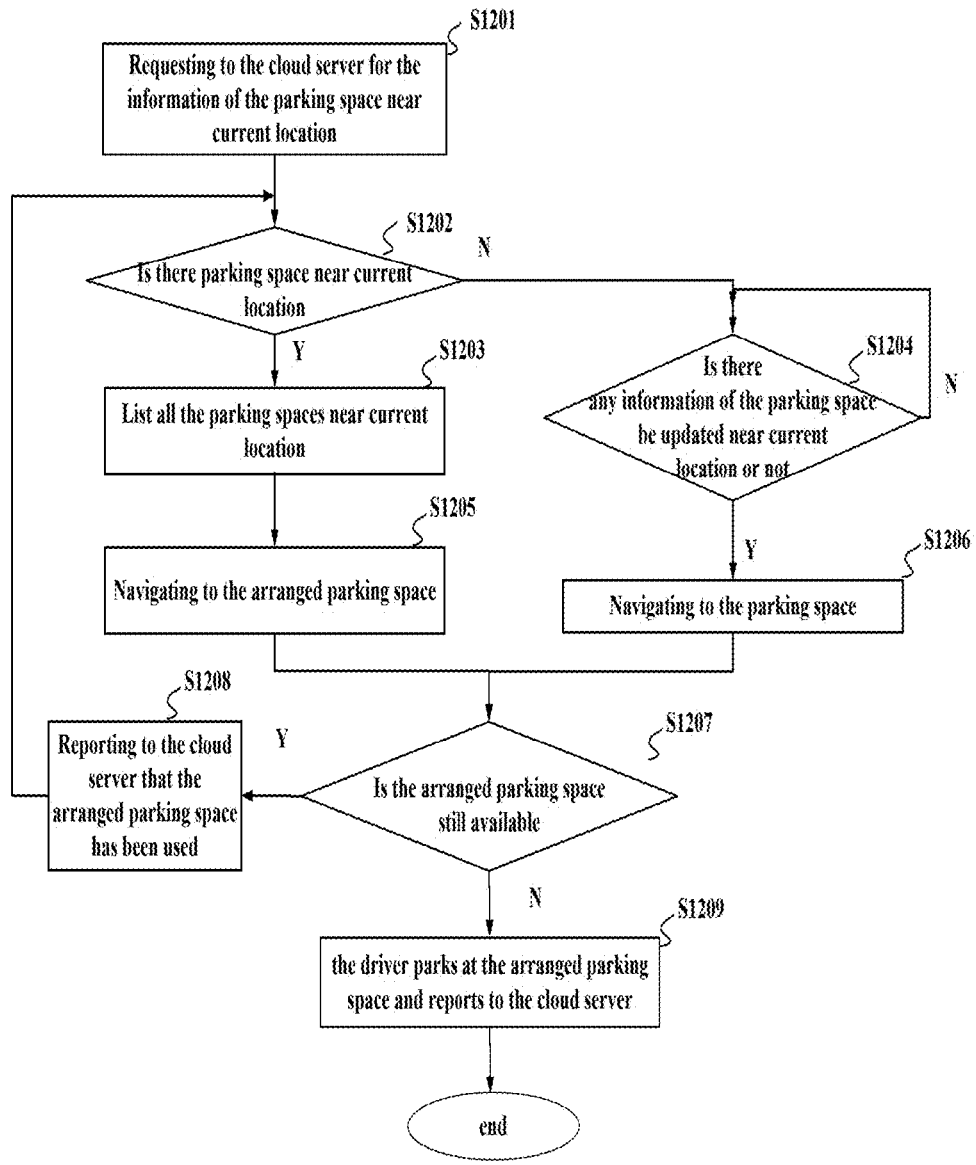
FIG. 12 is a chart of flow of steps in one embodiment relevant to a fourth traffic scenario.

Scenario 4:

The driver actively searches for the parking space. The parking space is navigated by the information interaction between the vehicle-mounted terminal/the user terminal and the cloud server. As shown in FIG. 12, the vehicle-mounted terminal or the user terminal requests the cloud server for the information of parking space near current location (S1201). The cloud server responds to the request and reports to the vehicle-mounted terminal or the user terminal whether there is the parking space near the current location (S1202). The vehicle-mounted terminal or the user terminal lists all parking spaces near current location when there is parking space near current location (S1203). An arranged parking space is navigated (S1205). The list of the parking spaces can be sorted according to the reliability and distance. The parking space with the highest reliability and the shortest distance will be assigned as the default selection. The driver can trigger the request actively. The request can be triggered by voice, button, or any user terminal recognizable command. The vehicle-mounted terminal or the user terminal updates the information of the parking space near current location continuously when there is no parking space near current location (S1204). The parking space will be navigated when there is new information of the parking space as an update (S1206). The parking space will be checked whether it is still available when the driver is navigated to the arranged parking space (S1207). It will report back to the cloud server when the arranged parking space is occupied (S1208) and goes back to step S1202. The driver parks at the arranged parking space and reports to the cloud server when the arranged parking space is unoccupied (S1209).

The method of parking guidance in the embodiment 1 is applied to the vehicle-mounted terminal or the user terminal. The parking guidance method can be used to guide the driver to find the parking space quickly according to the information interaction between the vehicle-mounted terminal/user terminal and the cloud server, or according to the information interaction between the vehicle-mounted terminal/user terminal, the MEC server and the cloud server. The efficiency of finding parking space can be improved and time to find parking can be reduced. The reliability of the parking space can be used to improve the accuracy of finding the parking space.

Figure 13:
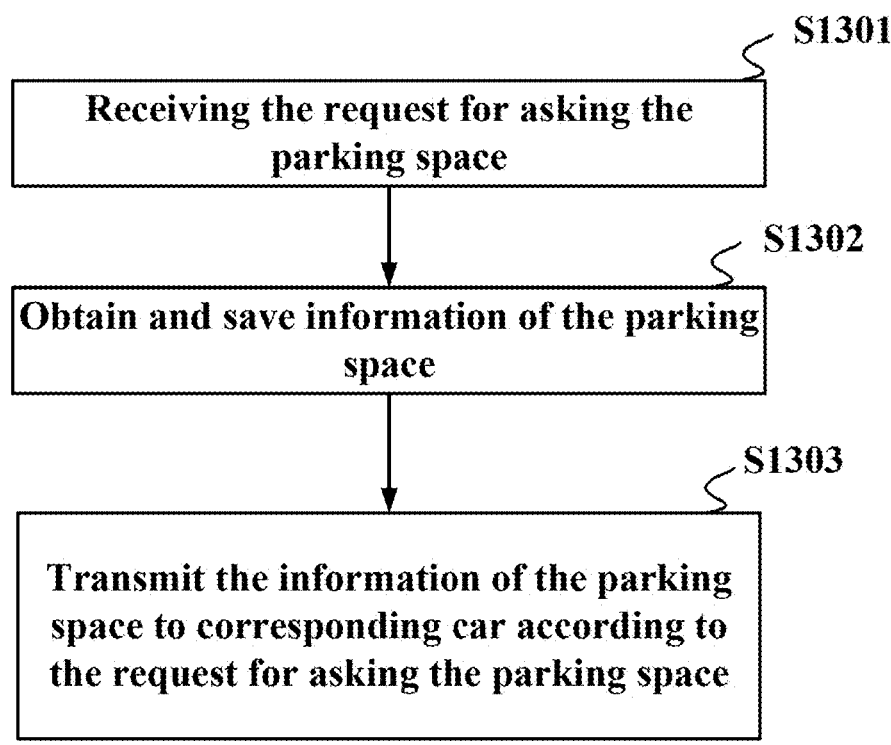
FIG. 13 is a flow chart of another method in one embodiment of parking guidance provided to a vehicle.

The method of parking guidance in embodiment 2 is applied to the cloud server. Referring to FIG. 13, the parking guidance method includes following steps: step S131, the request for parking space is received. Step S132, the information of the parking space is stored. Step S133, the information of the parking space is sent to the vehicle which transmits the request for the parking space.

The method of parking guidance in embodiment 2 is similar to the park guidance method of embodiment 1 (refer to FIG. 1). The difference is that the method in FIG. 1 is applied to the vehicle-mounted terminal or the user terminal, and the method in FIG. 13 is applied to the cloud server. The cloud server receives the information of parking space which is uploaded from the vehicle-mounted terminal or user terminal in real time. The cloud server stores the information of the parking spaces of different road sections and different time periods. The information of the parking spaces includes the reliability of the parking space. The cloud server receives the request for the parking space from the vehicle-mounted terminal or user terminal. The request for the parking space includes location and time information of the vehicle. The cloud server searches for the information of parking space according to location and time of the request sender when receiving the request for the parking space. The cloud server responses the information of the parking space to the request sender and guides the user to the parking space. In other embodiment, the cloud server shares the information of parking space to vehicle-mounted terminal or user terminal in real time. The cloud server can instantly update and share the information of the parking space near vehicle-mounted terminal or user terminal according to the location and time information of the vehicle-mounted terminal or user terminal. The cloud server can also share information about all the parking spaces within a certain range (such as districts, countries, streets, etc.) with each vehicle-mounted terminal or user terminal in real time.

The embodiment 3 provides an electronic device includes a memory, a processor, a program stored on the memory and a capable of running on the processor. The parking guidance method of embodiment 1 or embodiment 2 is implemented when the program is executed by the processor.

The electronic device of the embodiment, the processor can be a central processing unit (CPU), or can be other general-purpose processors, digital signal processor (DSP), and dedicated integrated circuits (Application Specific Integrated Circuit, ASIC), Field-Programmable Gate Array (FPGA), or other programmable logic device, discrete gate or transistor logic devices, discrete hardware components, etc. The general-purpose processor can be a microprocessor or the processor can also be any conventional processor, etc. The processor is the control center of the operable device of the parking guidance method, which uses various interfaces to connect the various parts of the operable device of the parking guidance method.

The memory can be used to store computer programs and/or modules. The processor can implement the parking guidance method by executing the programs, and/or modules stores in the memory. Various functions of the device can be operated. The memory includes a storage program area and a storage data area. The storage program area can store the operating system, at least one application program (such as sound playback function, image playback function, etc.), etc. The storage data area can store data created based on the use of the mobile phone (such as audio data, phone book). The memory can include high-speed random access memory and also include non-volatile memory, such as hard disks, memory, plug-in hard disks, smart memory card (smart media card, SMC), secure digital (secure digital, SD) card, flash memory card (flash card), at least one magnetic disk memory device, flash memory device or other volatile solid-state memory device.

The embodiment 4 provides a storage medium used in the memory. The storage medium stores one or more programs. The one or more programs can be executed by one or more processor to implement the embodiment 1 or the embodiment 2 of the parking guidance method. The storage medium of the embodiment includes volatile, non-volatile and removable implemented in any method or technology for storing information (such as computer readable instructions, data structures, program modules or other data). The storage media include but not limited to RAM, ROM, EEPROM, flash memory or other memory technologies, CD-ROM, digital versatile disk (DVD) or other optical disk storage, magnetic cassettes, magnetic tapes, magnetic disk storage or other magnetic storage device or any other medium that can be used to store desired information and that can be accessed by a computer.

Part of the features and technical effect in the embodiment 2 to the embodiment 4 can refer to the corresponding technical features and technical effects in the embodiment 1. The embodiments shown and described above are only examples. Therefore, many details of such art are neither shown nor described. Even though numerous characteristics and advantages of the technology have been set forth in the foregoing description, together with details of the structure and function of the disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for parking guidance, applicable to a vehicle-mounted terminal or a user terminal, comprising:
obtaining information of parking space and uploading the information of parking space to a cloud server in real time, wherein the information of the parking space comprises current location and current time of the parking space;
updating a reliability of the parking space from the cloud server;
guiding the vehicle to the parking space according to the information of parking space and the reliability of the parking space;
wherein the obtaining the information of parking space comprises:
obtaining images of parking areas;
obtaining a gray bar graph of the image of the parking area;
analyzing a gray value features of the gray bar graph to obtain the information of parking area according to the gray value features.

2. The method of claim 1 further comprises:
obtaining a probability value of the parking space according to the information of the parking space, wherein the probability value is calculated according to a historical data.

3. The method of claim 1 further comprises:
uploading a location and a status of use of the parking space.

4. The method of claim 1, a method of obtaining the images of parking areas comprises:
adjusting an image capture rate according to a speed of a vehicle.

5. The method of claim 4, wherein the image capture rate is positively correlated with the speed of the vehicle.

6. A device for parking guidance, comprising:
a memory;
a processor;
a program which is executed by the processor and is stored on the memory;
obtaining information of parking space, wherein the information of parking space includes a reliability of the parking space;
obtaining the reliability of the parking space according to a location of the parking space and time of the parking space;
guiding a vehicle to the parking space according to the information of the parking space;
wherein the obtaining the information of parking space comprises:
obtaining images of parking areas;
obtaining a gray bar graph of the image of the parking area;
analyzing a gray value features of the gray bar graph to obtain the information of parking area according to the gray value features.

7. The device of claim 6, wherein the method further comprises:
predicting a probability value of the parking space according to the information of parking space.

8. The device of claim 6, wherein the method further comprises:
uploading a location and a status of use of the parking space.

9. The device of claim 6, the step of obtaining the images of parking spaces further comprises:
   adjusting an image capture rate according to a speed of a vehicle.

10. The device of claim 9, wherein the image capture rate is positively correlated with the speed of the vehicle.

\* \* \* \* \*